United States Patent
Zerbini et al.

(10) Patent No.: US 6,370,954 B1
(45) Date of Patent: Apr. 16, 2002

(54) SEMICONDUCTOR INTEGRATED INERTIAL SENSOR WITH CALIBRATION MICROACTUATOR

(75) Inventors: Sarah Zerbini, Fontanellato; Benedetto Vigna, Pietrapertosa; Massimo Garavaglia, Robecchetto; Gianluca Tomasi, Vigevano, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/659,168

(22) Filed: Sep. 11, 2000

(30) Foreign Application Priority Data

Sep. 10, 1999 (EP) .............................................. 99830566

(51) Int. Cl.$^7$ ............................................... G01P 15/00
(52) U.S. Cl. .................................. 73/514.01; 73/514.02
(58) Field of Search ........................... 73/504.02, 504.03, 73/504.04, 504.08, 504.09, 504.12, 504.13, 514.32, 514.01, 514.02

(56) References Cited

U.S. PATENT DOCUMENTS

| 5,251,484 A | * 10/1993 | Mastache ................. 73/514.02 |
| 5,621,157 A | * 4/1997 | Zhao et al. .................. 73/1.38 |
| 6,257,062 B1 | * 7/2001 | Rich ....................... 73/514.32 |

FOREIGN PATENT DOCUMENTS

| EP | 0 840 092 A2 | 5/1998 |
| WO | 89/10567 | 11/1989 |
| WO | 95/34798 | 12/1995 |
| WO | 96/39615 | 12/1996 |

* cited by examiner

Primary Examiner—Richard A. Moller
(74) Attorney, Agent, or Firm—Lisa K. Jorgenson; E. Russell Tarleton; SEED IP Law Group PLLC

(57) ABSTRACT

An inertial sensor having an inner stator and an outer rotor that are electrostatically coupled together by mobile sensor arms and fixed sensor arms. The rotor is connected to a calibration microactuator comprising four sets of actuator elements arranged one for each quadrant of the inertial sensor. There are two actuators making up each set. The actuators are identical to each other, are angularly equidistant, and each comprises a mobile actuator arm connected to the rotor and bearing a plurality of mobile actuator electrodes, and a pair of fixed actuator arms which are set on opposite sides with respect to the corresponding mobile actuator arm and bear a plurality of fixed actuator electrodes. The mobile actuator electrodes and fixed actuator electrodes are connected to a driving unit which biases them so as to cause a preset motion of the rotor, the motion being detected by a sensing unit connected to the fixed sensor arms.

19 Claims, 3 Drawing Sheets

SEMICONDUCTOR INTEGRATED INERTIAL SENSOR WITH CALIBRATION MICROACTUATOR

TECHNICAL FIELD

The present invention regards a semiconductor integrated inertial sensor with calibration microactuator.

BACKGROUND OF THE INVENTION

As is known, the possibility of exploiting machinery and manufacturing processes typical of the microelectronics industry enables semiconductor integrated inertial sensors to be manufactured at a low cost, at the same time guaranteeing high reliability in terms of performance.

Although these inertial sensors are advantageous from various points of view, they present the drawback that their calibration is very complex, as well as costly, in that it is difficult to calibrate them at a wafer level.

In addition, the inertial sensors thus obtained have an offset and output/input sensitivity that depends upon the parameters of the process of fabrication, and consequently must be suitably calibrated.

In order to calibrate the sensor, one first known solution involves shaking of the inertial sensor, already inserted in its own package, on an electrodynamic or piezoelectric actuator validated according to required standards. The choice of a particular type of actuator is assessed on the basis of the range of the operating frequencies of the inertial sensor that is to be calibrated. The calibration curve that is obtained is then, generally, stored in a memory device formed in the die in which the inertial sensor itself is made. Even though this first known solution is advantageous from various points of view, it presents the drawback that it is extremely difficult to achieve at the wafer level.

A second known solution is described in U.S. Pat. No. 5,621,157, which envisages integration on one and the same wafer of the inertial sensor to be calibrated and of an electrostatic actuator, which simulates the unknown inertial quantity to be measured, and has the following characteristics:

it is linear in the voltage applied;

it is precise; i.e., its operation is practically independent of the parameters of the integration process.

"Practically independent" means that the electrostatic actuator has a configuration which is less sensitive than the inertial sensor is to the variations in the integration process adopted for the fabrication of the inertial sensor itself.

In addition, this second known solution is valid for all sensors, whether open loop sensors or closed loop sensors.

More in detail, the method and device described in U.S. Pat. No. 5,621,157 are implemented by means of an inertial sensor comprising one mobile electrode (rotor) and two fixed electrodes (stators), underneath which is set a service electrode (actuator also referred to as "ground plane"). By varying the voltage applied to the service electrode and keeping the voltage applied to the mobile electrode at a fixed value, a lateral force is produced that acts upon the mobile electrode along a direction parallel to the plane in which the service electrode lies. This lateral force is independent of the distance between the mobile electrode and the fixed electrodes, a distance which is markedly affected by the variations in the process of fabrication of the inertial sensor, and consequently it can be used as a reference force for the calibration of the inertial sensor itself.

Although this second solution is advantageous from a number of standpoints, it presents, however, the drawback that, at each variation in the voltage applied to the service electrode, there is produced on the mobile electrode, in addition to the lateral force, also a vertical force in a direction orthogonal to the plane in which the service electrode is set. In addition, the lateral force has a value other than zero only when different voltages are applied to the two fixed electrodes. Consequently, the method devised and the device made according to this second known solution are far from efficient in terms of conversion of electrical energy into mechanical energy, and are valid only for certain electrical configurations of the inertial sensor that is to be calibrated.

SUMMARY OF THE INVENTION

The technical problem that lies at the basis of the disclosed embodiments present invention is that of creating a semiconductor integrated inertial sensor with a calibration microactuator that is able to overcome the limitations and drawbacks referred to above in connection with the known art.

The technical problem is solved by an inertial sensor integrated in a body of semiconductor material and having a stator element and a rotor element that are electrostatically coupled together, the rotor element having a mobile mass, and a microactuator integrated in the body of semiconductor material, the microactuator connected to and coplanar with the mobile mass of the rotor element.

In accordance with another aspect of the present invention, the mobile mass is free to move in one direction and the microactuator has at least one first actuator element having at least one mobile actuator arm that is integral with the mobile mass and at least one first fixed actuator arm facing the mobile actuator arm, the mobile actuator arm and the first fixed actuator arm carrying respective multiple actuator electrodes and fixed actuator electrodes that are comb fingered together and extend in a direction substantially parallel to the first direction.

In accordance with yet another aspect of the invention, the mobile actuator electrodes extend on both sides of the mobile actuator arm, and the microactuator includes a second fixed actuator arm carrying a plurality of second fixed actuator electrodes that are comb fingered with respective mobile actuator electrodes, the first and second fixed actuator arms set on opposite sides with respect to a corresponding mobile actuator arm.

BRIEF DESCRIPTION OF THE DRAWINGS

The characteristics and advantages of the inertial sensor according to the embodiments invention will emerge from the ensuing description, which is given purely to provide a non-limiting illustration, with reference to the attached drawings, in which.

DETAILED DESCRIPTION OF THE INVENTION

Figure 1:
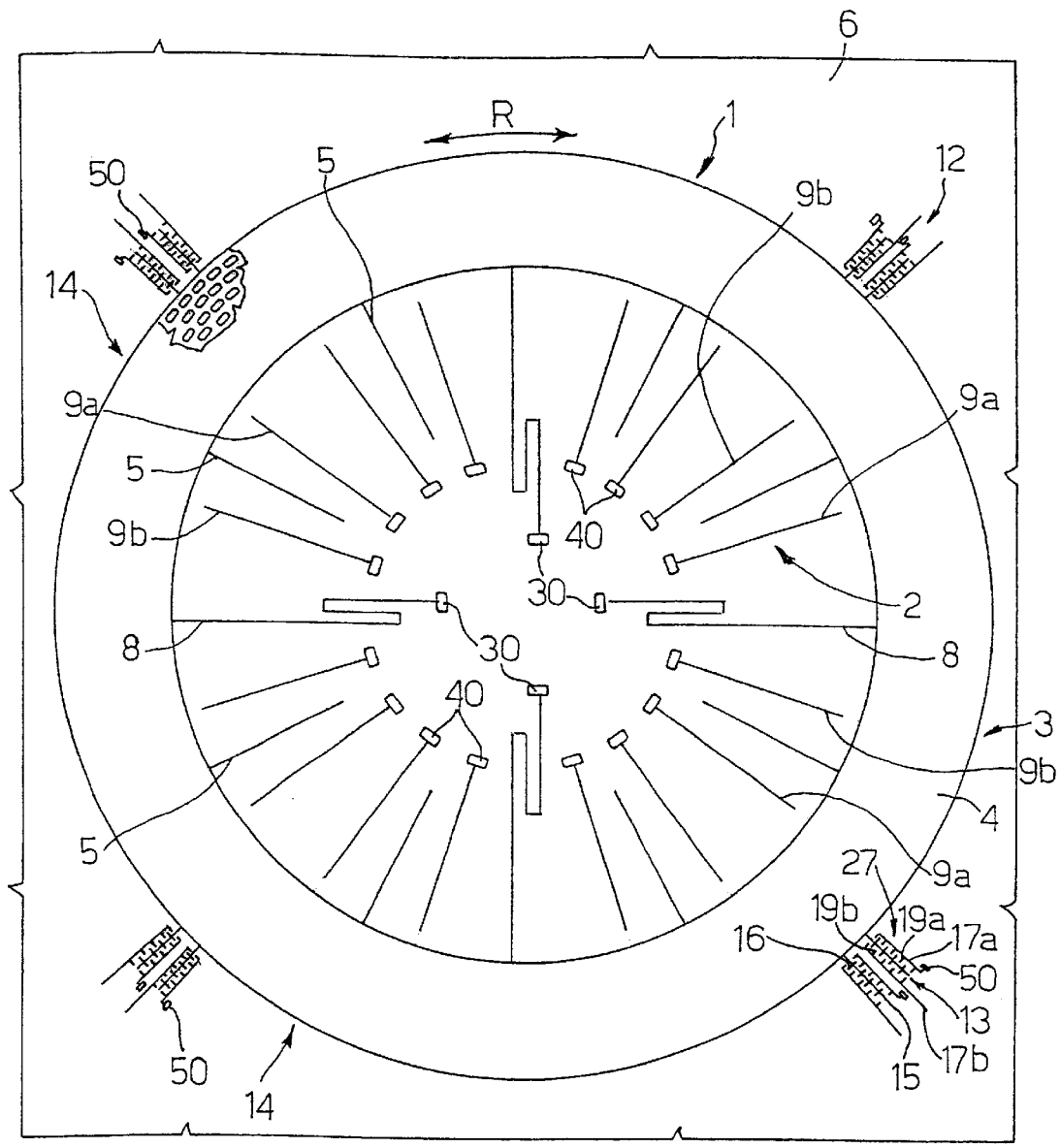
FIG. 1 schematically shows a first embodiment of an inertial sensor according to the present invention.

In FIG. 1, the reference number 1 designates an inertial sensor, for example an angular acceleration sensor, integrated in a semiconductor material, namely, silicon.

More in detail, the inertial sensor 1 comprises an inner stator 2, which is integral with a die 6 in which the sensor itself is made, and an outer rotor 3, capacitively coupled to the stator 2.

The rotor 3 comprises a mobile mass 4, which is suspended and has a basically annular shape, and a plurality of mobile sensor arms 5, which extend radially towards the stator 2 starting from the mobile mass 4, are identical to each other and are at the same angular distance apart, and elastic suspension and anchorage elements (springs 8) which elastically connect the mobile mass 4 to first anchoring and biasing regions 30, through which the rotor 3 and the mobile sensor arms 5 are biased at a biasing voltage Vr, typically of the value of 1.5 V.

The stator 2 comprises a plurality of pairs of fixed sensor arms 9a, 9b, one for each mobile sensor arm 5 of the rotor 3, which extend inside the mobile mass 4 itself, between the mobile sensor arms 5, and are fixed to second anchoring and biasing regions 40. The pairs of fixed sensor arms 9a, 9b are arranged in such a way that one mobile sensor arm 5 of the rotor 3 is set between a first fixed sensor arm 9a and a second fixed sensor arm 9b of a pair of fixed sensor arms 9a, 9b.

Typically, the stator 2 and the fixed sensor arms 9a, 9b are biased, through the second anchoring and biasing regions 40, at a biasing voltage Vs, which assumes values of between 1.5 V and 2.2 V.

Consequently, in the presence of angular stresses, the mobile mass 4 and the respective mobile sensor arms 5 rotate, in a micrometric way, either clockwise or counterclockwise, as indicated by the double headed arrow R.

A pair of fixed sensor arms 9a, 9b and the respective mobile sensor arm 5 set between them can be modeled as a capacitive divider made up of two variable capacitors connected in series together, in which the two outer plates are defined by the fixed sensor arms 9a and 9b of the stator 2, and the inner plates are defined by the mobile sensor arms 5 of the rotor 3. In addition, the capacitive dividers made up of all the pairs of fixed sensor arms 9a, 9b and of the respective mobile sensor arms 5 are connected together in parallel, with the intermediate nodes of the dividers connected together by means of the mobile mass 4. Consequently, the entire inertial sensor 1 may be represented in the way shown in FIG. 3, where the electrode SI represents the set of fixed sensor arms 9a and makes up a first variable capacitor 31, and the electrode S2 represents the set of fixed sensor arms 9b and makes up a second variable capacitor 32.

The inertial sensor 1 also comprises an integrated microactuator 12 connected to the rotor 3.

Figure 2:
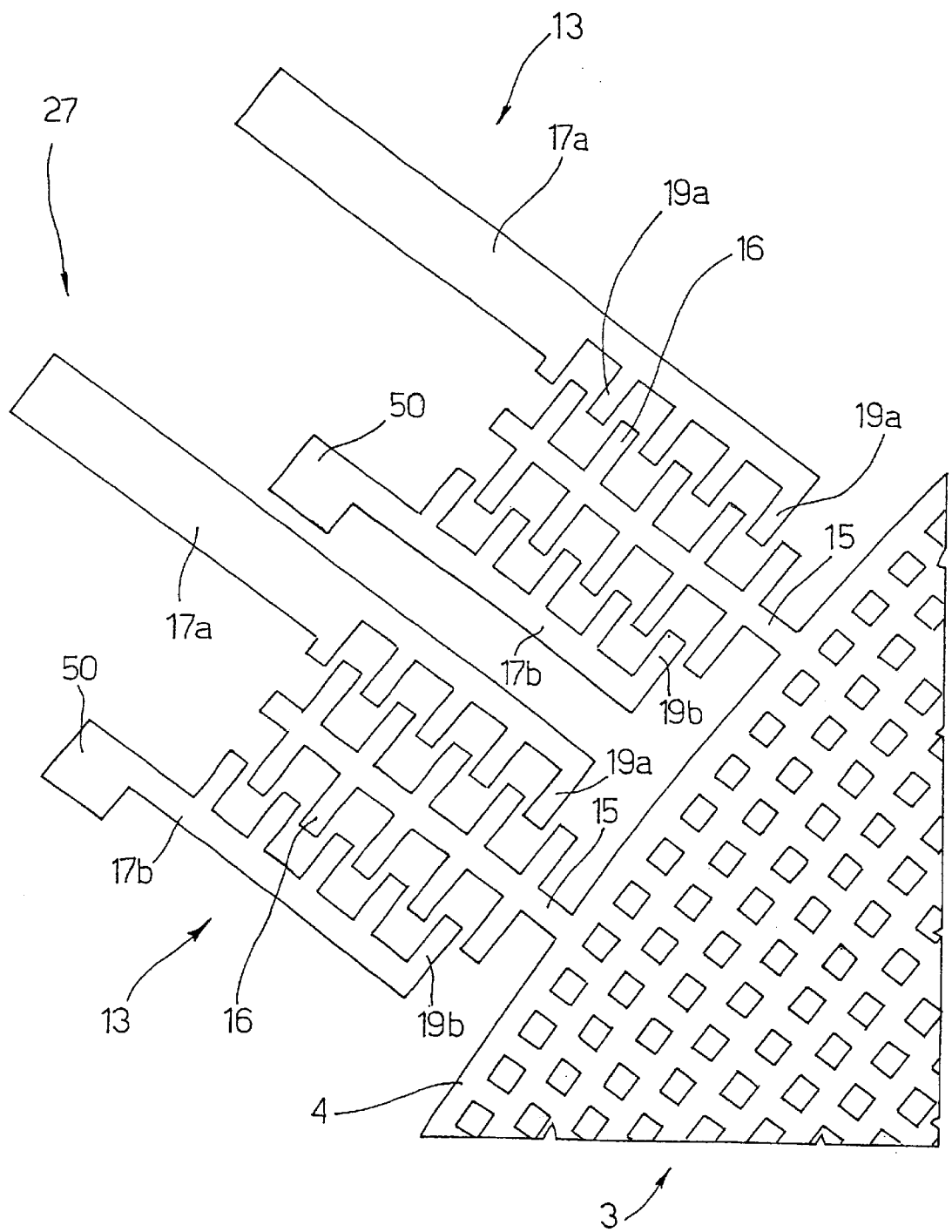
FIG. 2 shows an example of embodiment of a microactuator for calibrating the inertial sensor of FIG. 1.

More in detail, as shown in FIGS. 1 and 2 the microactuator 12 comprises four sets 27 of actuator elements 13 connected to and coplanar with the rotor 3. The sets 27 are arranged one for each quadrant 14 of the inertial sensor 1 and are angularly equidistant.

In particular, there are two actuator elements 13 for each set 27, which are identical to each other, and each of which comprises a mobile actuator arm 15 which is connected to the mobile mass 4 of the rotor 3 and extends radially outwards, starting from the mobile mass 4 itself. Each mobile actuator arm 15 carries a plurality of mobile actuator electrodes 16, which extend on either side of the respective mobile actuator arm 15 in a basically circumferential direction, the mobile actuator electrodes 16 being positioned equidistantly along the respective mobile actuator arm 15.

Each actuator element 13 moreover includes a pair of fixed actuator arms 17a, 17b, which extend radially, each pair of fixed actuator arms 17a, 17b being made up of a first fixed actuator arm 17a and a second fixed actuator arm 17b which are set on opposite sides with respect to the corresponding mobile actuator arm 15. The first fixed actuator arm 17a carries a plurality of first fixed actuator electrodes 19a, and the second fixed actuator arm 17b carries a plurality of second fixed actuator electrodes 19b.

The fixed actuator arms 17a, 17b are constrained to third anchoring and biasing regions 50, through which they are biased at a biasing voltage Vb, which assumes values of between 1.5 V and 5 V.

The fixed actuator electrodes 19a, 19b extend in a basically circumferential direction towards the respective mobile actuator arm 15 and are interspaced or comb fingered with the mobile actuator electrodes 16. In practice, the fixed actuator electrodes 19a, 19b and the respective mobile actuator electrodes 16, like the fixed sensor arms 9a, 9b and the mobile sensor arms 5, the fixed actuator electrodes 19a, 19b and the respective mobile actuator electrodes 16 of each actuator element 13, may be modeled as a capacitive divider made up of two capacitors connected in series together, in which the two outer plates are defined by the fixed actuator electrodes 19a, 19b, and the two inner plates are defined by the mobile actuator electrodes 16. In addition, the capacitive dividers made up of all the actuator elements 13 are connected together in parallel, with the intermediate nodes of the dividers connected together via the mobile mass 4. Consequently, the microactuator 12 may be represented in the way shown in FIG. 3, where the electrode S3 represents the set of fixed actuator electrodes 19a and forms a first actuation capacitor 33, and the electrode S4 represents the set of fixed actuator electrodes 19b and forms a second actuation capacitor 34.

Figure 3:
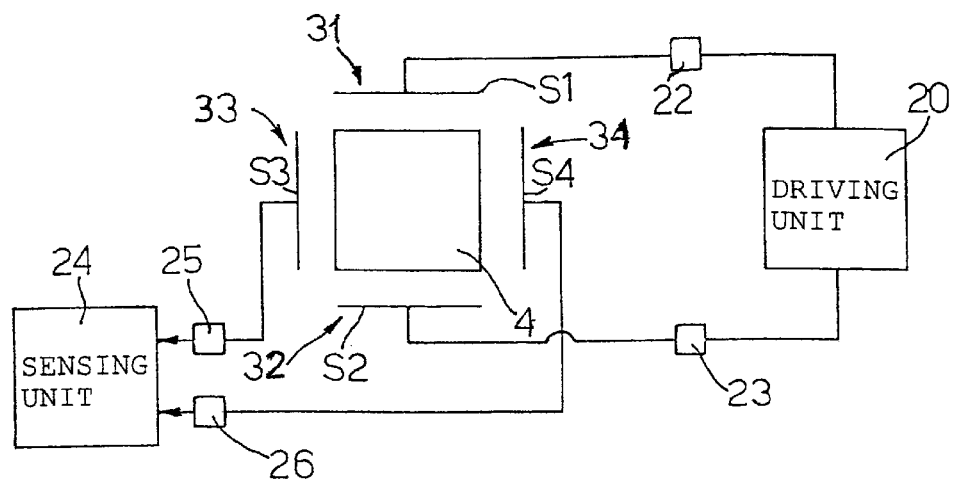
FIG. 3 shows the equivalent electrical diagram of the structure of FIG. 1.

FIG. 3 moreover shows a calibration circuit for calibrating the inertial sensor 1, which comprises a driving unit 20 having output terminals 22 and 23 coupled, respectively, to the fixed actuator arms 17a and 17b, and hence to the electrodes S1 and S2, and a sensing unit 24 having input terminals 25 and 26 coupled, respectively, to the fixed sensor arms 9a and 9b of the stator 2, and hence to the electrodes S3 and S4. The driving unit 20, as described more in detail in what follows, generates driving voltages V1(t) and V2(t) oscillating in opposition with respect to a constant mean value Vd(t).

Operation of the inertial sensor 1 is as follows:

The driving voltages V1(t) and V2(t), equal to $V1(t) = Vb + Vd(t)$, and $V2(t) = Vb - Vd(t)$ where Vb is a constant biasing voltage and Vd(t) is an alternating voltage, for example square wave or sinusoidal wave, are applied, respectively, to the fixed actuator electrodes 19a and 19b by the driving unit 20.

The voltages V1(t) and V2(t) alternately generate, on the mobile mass 4, a transverse force proportional to the number of fixed actuator electrodes 19a, 19b and to the number of interacting mobile actuator electrodes 16. In addition, given that the voltages V1(t) and V2(t) are in counterphase, this transverse force is directed first in one direction and then in the opposite direction.

In particular, this transverse force tends to move each mobile actuator electrode 16 away from the fixed actuator electrodes 19a, 19b , with respect to which the mobile actuator electrode 16 has a lower potential difference, and to bring the mobile actuator electrode 16 closer to the fixed actuator electrodes 19b, 19a, with respect to which it has a higher potential difference. In this way, the mobile mass 4 undergoes a rotary motion having a twisting moment $\tau$ proportional to the biasing voltage Vb of the fixed actuator arms 17a, 17b and to the alternating voltage Vd(t), according to the following relation:

$$\tau = \alpha * Vb * Vd(t)$$

where the parameter $\alpha$ is the precision of the microactuator 12 and depends upon the number of pairs of electrodes, their thickness and relative distance, according to the following relation:

$$\alpha = 4 * \epsilon_0 * N * R_m * t / g$$

where $\epsilon_0$ is the electric constant, N is the number of electrodes, $R_m$ is the distance of the electrodes from the center of rotation, t is the thickness of the electrodes (which coincides with the thickness of the polysilicon used for making them on the wafer), and g is the distance between the electrodes.

The twisting moment $\tau$ is independent of the relative displacement between the fixed actuator electrodes 19a, 19b and the mobile actuator electrodes 16 in that it depends only upon the distance g of the pairs of mobile/fixed electrodes, which is constant, and does not depend upon the area of mutual facing, which is variable, given that the electrodes extend substantially parallel to the direction of motion R of the rotor 3, and hence of the mobile electrodes 15.

The twisting moment $\tau$, to which the mobile mass 4 is subjected, thus determines a modulation in phase opposition of the capacitances of the two variable capacitors 31, 32, the two outer plates of which are defined by the fixed sensor arms 9a, and 9b of the stator 2, and the two inner plates of which are defined by the mobile sensor arms 5 of the rotor 3. Of these two variable capacitors 31, 32, the one defined by the mobile sensor arms 5 and by the fixed sensor arm 9a, 9b that is at a smaller distance makes up the effective capacitor, which determines the generation of the sensing signal that indicates the twisting moment $\tau$ to which the mobile mass 4 is subjected.

This sensing signal is then sent to the input terminals 25 and 26 of the sensing unit 24, which uses it as a reference signal for calibrating the inertial sensor 1.

The advantages that may be obtained with the inertial sensor described herein are the following: In the first place, the actuator elements 13 are defined on silicon together with the mobile mass 4, and consequently do not require additional fabrication phases. In addition, the inertial sensor 1 is more efficient as regards the conversion of electrical energy into mechanical energy, because the microactuator 12 does not generate any force that acts perpendicularly on the mobile mass 4. Furthermore, since the transverse force that acts on the mobile mass 4 is independent of the biasing voltages applied to the rotor 3 and the stator 2 of the inertial sensor 1, calibration of the inertial sensor 1 is independent of its own operating voltage. The last two advantages described are very important in that they render the inertial sensor 1 less costly in terms of energy and, above all, render the circuit configuration of the microactuator 12 independent of the circuit configuration of the inertial sensor 1 (for example, sigma delta, frequency modulation). In addition, the comb finger configuration chosen for the fixed actuator electrodes 19a, 19b and mobile actuator electrodes 16 is not affected by the problem of electrostatic softening (i.e., reduction in the rigidity of the system). Consequently, the characteristics of the actuator are not modified, and the latter may exert a force independent of the displacement.

Furthermore, for the fabrication of the inertial sensor 1 any type of micromachining technology may be used (for example, surface or epitaxial micromachining, metal electroplating, etc.).

Finally, it is clear that numerous modifications and variations may be made to the inertial sensor described and illustrated herein, all falling within the scope of the inventive idea as defined in the attached claims and the equivalents thereof.

For example, the number of sets 27 of actuator elements 13 and the number of actuator elements 13 in each set 27 could be different from what has been described; in particular, it would be possible to envisage even a single actuator element 13 connected to the mobile mass 4 of the rotor 3, or else two actuator elements 13 could be envisaged, set on diametrically opposite sides of the mobile mass 4.

Figure 4:
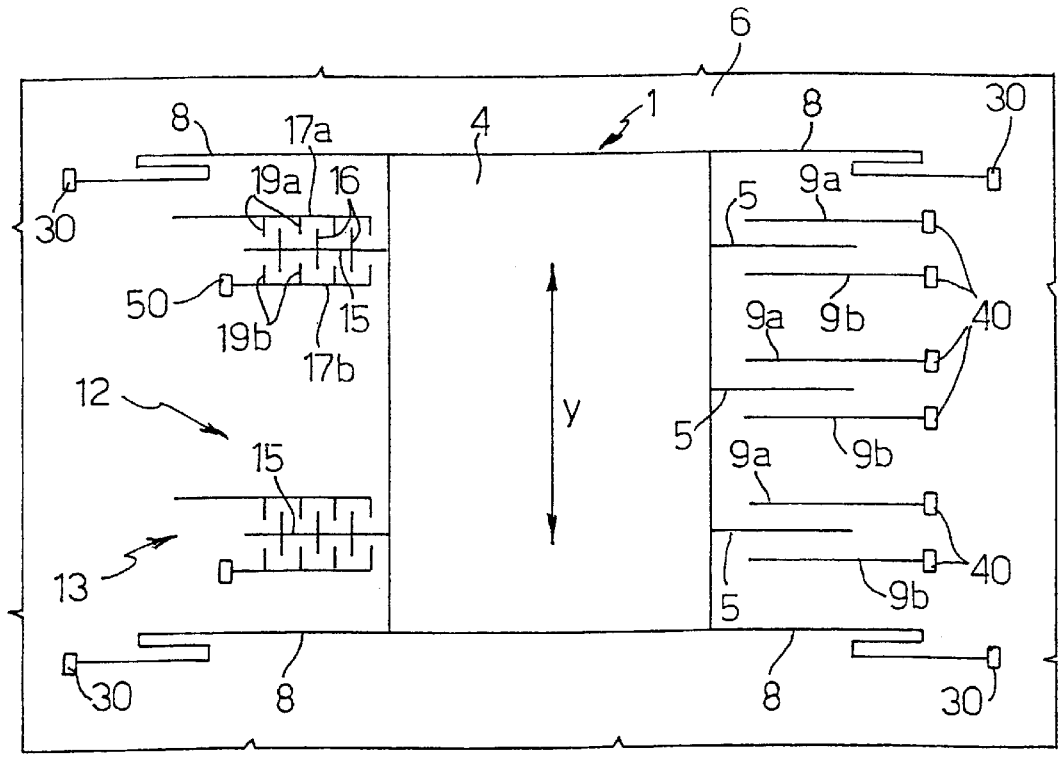
FIG. 4 is a schematic representation of a second embodiment of the inertial sensor according to the present invention.

In addition, the inertial sensor 1 may be of a linear type, as shown in FIG. 4, in which the various parts of the inertial sensor are indicated by the same reference numbers as those used in FIG. 1. In this case, the microactuator 12 is driven so as to impress on the mobile mass 4 a vibratory motion along a direction Y, and the mobile actuator electrodes 16 and fixed actuator electrodes 19a, 19b are parallel to the direction Y.

What is claimed is:

1. An inertial sensor integrated in a body of semiconductor material, comprising: a stator element and a rotor element that are electrostatically coupled together, said rotor element comprising a mobile mass, and microactuator means integrated in said body of semiconductor material, said microactuator means connected to and coplanar with said mobile mass of said rotor element.

2. The inertial sensor of claim 1, wherein said mobile mass is free to move in one direction and said microactuator means comprise at least one first actuator element having at least one mobile actuator arm that is integral with said mobile mass and at least one first fixed actuator arm facing said mobile actuator arm, said mobile actuator arm and said first fixed actuator arm carrying respective mobile actuator electrodes and first fixed actuator electrodes that are comb fingered together and extend in a second direction substantially parallel to said one direction.

3. The inertial sensor of claim 2, wherein in that said mobile actuator electrodes extend on both sides of said mobile actuator arm and said microactuator means comprise a second fixed actuator arm carrying a plurality of second fixed actuator electrodes which are comb fingered with respective mobile actuator electrodes, said first and second fixed actuator arms being set on opposite sides with respect to a corresponding mobile actuator arm.

4. The inertial sensor of claim 3, wherein said mobile mass has an annular shape; said mobile actuator arm extends radially outwards from said mobile mass; said first and second fixed actuator arms extend radially towards said mobile mass; said mobile actuator electrodes extend in a substantially circumferential direction and are set equidistantly apart from one another along said mobile actuator arm; and said first and second fixed actuator electrodes extend in a substantially circumferential direction.

5. The inertial sensor of claim 3, wherein said rotor element moreover comprises a plurality of mobile sensor arms that extend from said mobile mass, and said stator element comprises a plurality of pairs of fixed sensor arms facing said mobile sensor arms, each pair of fixed sensor arms comprising a first fixed sensor arm and a second fixed sensor arm that are set on opposite sides with respect to the corresponding mobile sensor arm.

6. The inertial sensor of claim 4, wherein the inertial sensor constitutes an angular acceleration sensor.

7. The inertial sensor of claim 3, wherein said one direction is a rectilinear direction, and said sensor constitutes a sensor of rectilinear motion.

8. The inertial sensor of claim 3, further comprising a driving unit having output terminals coupled to said fixed actuator arms and a sensing unit having input terminals coupled to said fixed sensor arms.

9. The inertial sensor of claim 2, wherein said microactuator means comprise further actuator elements that are identical to said at least one first actuator element, said at least one first actuator element and further actuator elements being set symmetrically with respect to said mobile mass.

10. The inertial sensor of claim 1, wherein said microactuator means comprise at least one set of actuator elements, each set of actuator elements comprising at least two actuators that are identical to one another and angularly equidistant from one another.

11. An inertial sensor system formed in a body of semiconductor material, comprising:
a stator and a rotor electrostatically coupled together by mobile sensor arms and fixed sensor arms;
a calibration device coupled to the rotor;
a drive unit coupled to the calibration device, the calibration device and the drive unit configured to cause a preset motion of the rotor; and
a sensing unit coupled to the stator and configured to sense the motion of the rotor.

12. The system of claim 11, wherein the calibration device comprises a microactuator comprising at least one first actuator element having at least one mobile actuator arm that is integral with the rotor and at least one fixed actuator arm facing the mobile actuator arm, the mobile actuator arm and the fixed actuator arm having mobile actuator electrodes and fixed actuator electrodes, respectively, that are comb fingered together.

13. The system of claim 11, wherein the calibration device comprises a microactuator that comprises four sets of actuator elements arranged one for each quadrant of the inertial sensor.

14. The system of claim 13, wherein each set of the four sets of actuator elements comprises first and second actuators that are identical to each other and are angularly equidistant apart.

15. The system of claim 14, wherein each actuator comprises a mobile actuator arm connected to the rotor and having a plurality of mobile actuator electrodes, and a pair of fixed actuator arms formed on opposite sides of the mobile actuator arm and having a plurality of fixed actuator electrodes.

16. The system of claim 15, wherein the mobile actuator electrodes and the fixed actuator electrodes are connected to the driving unit, and the driving unit is configured to bias the mobile actuator electrodes and the fixed actuator electrodes to cause the preset motion of the rotor.

17. The system of claim 13, wherein the microactuator is coupled to and coplanar with the rotor.

18. The system of claim 17, wherein the rotor comprises a mobile mass that is free to move in a first direction, and the microactuator comprises at least one actuator having at least one mobile actuator arm that is integral with the mobile mass and first and second fixed actuator arms facing the mobile actuator arm, the mobile actuator arm and the first and second fixed actuator arms carrying respective mobile actuator electrodes and fixed actuator electrodes that are comb fingered together and extend in a second direction substantially parallel to the first direction.

19. The system of claim 18, wherein the mobile mass has an annular shape, and the mobile actuator arm extends radially outwards from the mobile mass; the first and second fixed actuator arms extend radially towards the mobile mass; the mobile actuator electrodes extend in a substantially circumferential direction and are set equidistantly apart from one another along the mobile actuator arm; and the first and second fixed actuator electrodes extend in a substantially circumferential direction.

* * * * *